C. W. DUDLEY.
BOTTLE CAP.
APPLICATION FILED JAN. 23, 1915.
1,239,261. Patented Sept. 4, 1917.
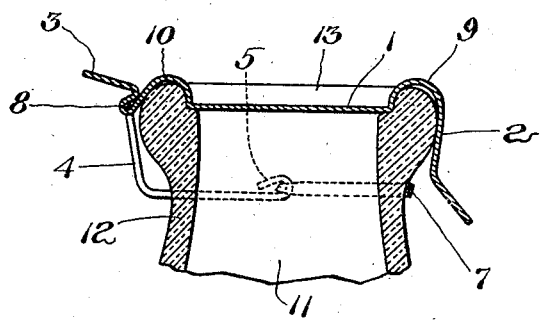
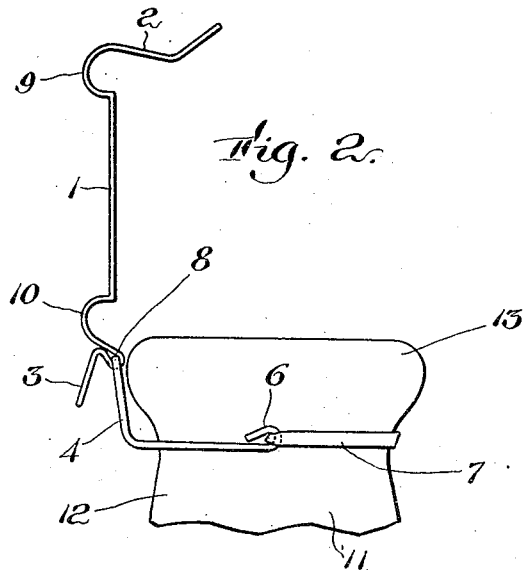
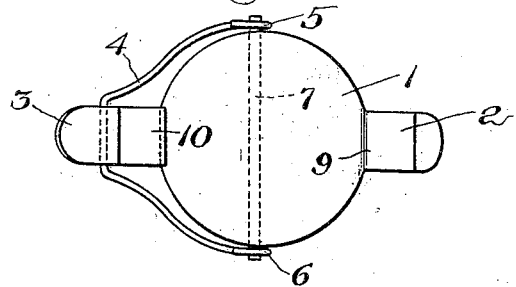
Inventor:
Chester W. Dudley,
by James R. Hodder
Attorney.

UNITED STATES PATENT OFFICE.

CHESTER W. DUDLEY, OF BOSTON, MASSACHUSETTS.

BOTTLE-CAP.

1,239,261. Specification of Letters Patent. Patented Sept. 4, 1917.

Application filed January 23, 1915. Serial No. 4,056.

*To all whom it may concern:*

Be it known that I, CHESTER W. DUDLEY, a citizen of the United States, and resident of Boston, county of Suffolk, and State of Massachusetts, have invented an Improvement in Bottle-Caps, of which the following description, in connection with the accompanying drawings, is a specification, like characters on the drawings representing like parts.

My present invention is a bottle cap which is capable of being readily attached to and removed from any sized bottle, jar, or the like, and may be used repeatedly. My improved bottle cap is particularly useful and valuable in connection with milk bottles, where it is of great importance to provide a cap or cover which may be quickly attached or detached, washed, and of simple construction without grooves, ridges, or the like, which would carry dust, dirt, etc., and, therefore, a cover which is perfectly hygienic and sanitary. Furthermore, it is an important feature of my present invention to provide a cap and attaching means therefor which will constitute a hinged cover, capable of being temporarily opened, and automatically held opened while the contents of the bottle, or a part thereof, are poured out, and which cover may then be instantly swung into place and automatically retained in closed position. Additional objects of the invention are to provide a bottle cap which will be economical to manufacture, simple in construction, and capable of long and continued use on different sized bottles.

Other details of construction, advantages and features will be hereinafter pointed out and claimed.

Referring to the drawings illustrating my improved bottle cap—

Figure 1 is a view in cross-section of a portion of a milk bottle and my cap applied thereto in closed position;

Fig. 2 is a view of the top portion of a bottle with the cap in raised position; and Fig. 3 is a plan view of the cap detached from the bottle.

While I have illustrated my bottle cap as applied to a milk bottle of ordinary and well known type, and although this is a large and important field of usefulness for bottle caps of this kind, it will be readily understood that there are many purposes where a temporary cover and one capable of being raised or closed, is desirable, such as medicine-containing bottles, all food containing jars or bottles, and any similar receptacle where it is desirable to have a hinged cover. In the use of the ordinary milk bottle, it is especially important to employ a hinged cover which will keep the contents from contamination, and protected, as the contents of such bottles is partially poured out from time to time and it is desirable to keep the bottle covered meanwhile.

As illustrated in the drawings, I prefer to make my bottle cap of two metal pieces, the cover portion being stamped from thin sheet metal and comprising the cap or cover 1, front clasp or clip 2, and rear hinge lug 3. Attached to the hinge portion 3 is a wire member 4 arranged to partially inclose or straddle the neck of a bottle, and having the ends formed as hooks or loops 5 and 6 to frictionally engage the bottle neck and to receive and retain a rubber band 7, spring, or other resilient member. As shown in the drawings, I prefer to make the front clasp 2 as a short extending piece which may spring on the rim of a bottle, and the rear lug 3 is formed directly opposite thereto on the cover 1 with a doubled or loop-like part 8 to inclose the straight middle part of the wire 4, thus constituting a hinge. The wire 4 is preferably made with its arms of similar size and length and with substantially a horizontal portion formed of open U-shaped arms to "snap" onto the bottle neck on which the hooks 5 and 6 are carried, and with short upstanding vertical portions to engage the loop 8 of the hinge part. This upstanding portion will depend upon the distance of the neck of the bottle below the top, although, as is well known in milk bottles, this distance varies but slightly, and, therefore, my cap is applicable to any milk bottle of ordinary size. For medicine bottles, a slightly modified construction might be required. Attached to the hooks 5 and 6 is the rubber band 7, which enables the device to be attached to different sized receptacles, and when so attached will exert a considerable tension on the wire member 4 and hinge of the cap. The portion 1 of the cap is stamped out to fit and cover the top of a bottle, and as illustrated in the drawing it is of appropriate diameter and size to fit onto the annular shoulder depressed in the top of the milk bottle, and also the clasp 2 and hinge part 3 are connected to the cap 1 by curved spring-like portions 9 and 10 respectively. I have illustrated the top portion of a bottle 11 of ordinary type used in supplying milk, which bottle has a broad neck 12 and a flaring rim 13. My cap may be attached thereon by merely slipping the rubber band 7 over the rim 13, and the contraction of the band or spring will at once automatically fit, adjust and hold the entire device onto the bottle, retaining the same under a constant tension. As shown in Fig. 1, the cover when moved downwardly is maintained in position by the resiliency of the spring clasp 2, fitting over and slightly under the flaring rim 13 of the bottle. When it is desired to open the bottle, a slight pressure under the clip 2 will "spring" said clip or clasp off that part of the rim on which it is held and the tension of the rubber band 7 will at once exert a downward and forward movement on the wire member 4, and thus tend to automatically open the entire cover. The hinge 3 being pulled downwardly against the rim 13 of the bottle, said rim acts as a fulcrum, and the leverage on the hinge of the wire member 4 under tension of the rubber band or spring will swing the entire cover upwardly and hold the same substantially in the position shown in Fig. 2. Thus the contents of the bottle may be poured out without difficulty or hindrance and without coming into contact with the cover, and the cover itself may be again snapped downwardly into position.

It will thus be seen that my improved bottle cap constitutes a readily attachable and detachable hinged cover to a jar or bottle, converting such jar, bottle or receptacle into a covered pitcher in a simple and efficient manner. Also, should the rubber band 7 be lost or destroyed, the cap can be easily used with any similar rubber band, or spring which are common articles of commerce, no special band being required to complete and operate the device.

It will be noted that the cover 1 is always held tightly pressed into position when closed, the resiliency of the clasp or clip 2 holding the cover at one point and the rubber band 7 exerting a downward tension on the hinge 3 at the opposite point. It will also be readily appreciated that, when applying the cap to a receptacle, the rubber band or other resilient member may be detached from one hook and slipped around the neck of the receptacle and caught from the other hook of the member 4. Also, it is an advantage of this cap to permit the rubber band 7, or resilient member, to be hooked over the clip or clasp 2 and thus hold the same locked downwardly in closed position, preventing accidental opening or spilling of the contents should the receptacle be upset.

Having described my invention, what I claim as new and desire to secure by Letters Patent is:

1. A device of the kind described, comprising a hinged metallic cover for bottles, said cover having a spring clasp at one point to fit over the rim of the bottle, and a hinge lug at the opposite side, a metallic hinge clasp having a vertically extending portion adapted to be pivotally attached to the hinge lug of said cap cover, and with horizontal U-shaped spring arms adapted to straddle and partially inclose bottle necks of various sizes with a spring tension and means to retain the grip of said arms on the bottle neck.

2. A device of the kind described, comprising a hinged metallic cover for bottles, said cover having a spring clasp at one point to fit over the rim of the bottle, and a hinge lug at the opposite side, a metallic hinge clasp having a vertically extending portion adapted to be pivotally attached to the hinge lug of said cap cover, and with horizontal U-shaped spring arms adapted to straddle and partially inclose bottle necks of various sizes with a spring tension, the ends of said U-shaped arm being adapted to receive a yielding member to inclose the remaining portion of the bottle neck not clasped by said arms.

In testimony whereof, I have signed my name to this specification, in the presence of two subscribing witnesses.

CHESTER W. DUDLEY.

Witnesses:
T. ALBERT HIGGINS,
HARRY W. KIMBALL.

Copies of this patent may be obtained for five cents each, by addressing the "Commissioner of Patents, Washington, D. C."